(12) United States Patent
Watanabe et al.

(10) Patent No.: US 7,079,702 B2
(45) Date of Patent: Jul. 18, 2006

(54) IMAGE PROCESSING METHOD AND APPARATUS FOR JUDGING IMAGE CONDITION AND CORRECTING IMAGE

(75) Inventors: Masahiro Watanabe, Kawasaki (JP); Kouichi Fujimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 10/629,718

(22) Filed: Jul. 30, 2003

(65) Prior Publication Data

US 2004/0105595 A1 Jun. 3, 2004

Related U.S. Application Data

(63) Continuation of application No. PCT/JP02/00605, filed on Jan. 28, 2002.

(30) Foreign Application Priority Data

Jan. 30, 2001 (JP) .............................. 2001-022337

(51) Int. Cl.
*G06K 9/40* (2006.01)
*G06K 9/00* (2006.01)

(52) U.S. Cl. ...................... 382/274; 382/167; 348/251; 348/254

(58) Field of Classification Search ................ 382/167, 382/274; 348/251, 254
See application file for complete search history.

(56) References Cited

U.S. PATENT DOCUMENTS 5,544,258 A * 8/1996 Levien ........................ 382/169
5,748,802 A * 5/1998 Winkelman .................. 382/271
6,169,282 B1 * 1/2001 Maeda et al. ................ 250/310
6,539,106 B1 * 3/2003 Gallarda et al. ............ 382/149
6,580,825 B1 * 6/2003 Bhaskar ....................... 382/169
6,826,310 B1 * 11/2004 Trifonov et al. ............. 382/274
6,862,363 B1 * 3/2005 Brown et al. ................ 382/129
2002/0054712 A1 * 5/2002 Sun ............................. 382/274

FOREIGN PATENT DOCUMENTS

| JP | 01-302962 | 12/1989 |
| JP | 04-304776 | 10/1992 |
| JP | 05-308517 | 11/1993 |
| JP | 09-200525 | 7/1997 |
| JP | 10-200752 | 7/1998 |

OTHER PUBLICATIONS

PCT Search Report for related application PCT/JP02/00605.

* cited by examiner

*Primary Examiner*—Jingge Wu
*Assistant Examiner*—Aaron Carter
(74) *Attorney, Agent, or Firm*—Staas & Halsey LLP

(57) ABSTRACT

An image condition is judged based on a mean value and a standard deviation of a feature quantity of an image, and image correction information in the image condition is created based on the mean value and the standard deviation, to thereby correct the image, based on the created image correction information. In this manner, parameters for the image correction processing are determined automatically and highly accurately corresponding to the feature quantity of the image, and the image correction processing is performed based on the parameters. Therefore, the image quality can be improved, while considerably reducing the labor of the operator who performs the image processing.

8 Claims, 6 Drawing Sheets

(A)

(B)

(C)

| 0.0 | 0.0 | 0.1 |
|---|---|---|
| 0.2 | 0.0 | 0.1 |
| 1.0 | 0.1 | 0.1 |

IMAGE PROCESSING METHOD AND APPARATUS FOR JUDGING IMAGE CONDITION AND CORRECTING IMAGE

This application is a continuing application, filed under 35 U.S.C. §111(a), of International application PCT/JP02/00605, filed Jan. 28, 2002, which International Application, in turn, claims priority benefit based upon Japanese Patent Application No. 2001-022337, filed Jan. 30, 2001, the contents of which are incorporated by reference.

TECHNICAL FIELD

The present invention relates to an image processing technique that determines automatically and highly accurately parameters for image correction processing, and improves the image quality of an image.

BACKGROUND ART

Heretofore, there has been performed gradation correction processing such as changing the brightness or contrast of an image which requires the improvement in image quality, using an image processing apparatus. In such an image processing apparatus, an operator recognizes a problem in the image subjectively, and determines parameters for improving the problem based on his/her experience, to thereby perform the gradation correction processing by trial and error.

However, since the gradation correction processing is performed by trial and error, sometimes the operator must perform the gradation correction processing repetitively, while changing the parameters diversely, until the intended image quality can be obtained. In this case, labor of the operator required for improving the image quality is considerable, and this problem is particularly noticeable in general users who use photo-retouching software or the like, since they do not have enough knowledge relating to image processing.

Recently, a technique for automatically performing image correction processing has been developed, in order to reduce the labor of the operator. With this technique however, since the parameters for the image correction processing are determined, without recognizing a main object in the image, a corrected image may be significantly different from the image quality that the operator intends.

In view of the problems described above, it is an object of the present invention to provide an image processing technique that can improve the image quality, while considerably reducing the labor of the operator, by determining automatically and highly accurately parameters for the image correction processing, corresponding to a feature quantity of the image.

DISCLOSURE OF THE INVENTION

In an image processing technique according to the present invention, an image condition is judged based on a mean value and a standard deviation of feature quantity of an image, and also image correction information in the image condition is created based on the mean value and the standard deviation, to thereby correct the image, based on the created image correction information. The "image condition" herein stands for an index for classifying, for example, the brightness of the image as "bright", "normal" or "dark", and the contrast as "high", "normal" or "low".

In this manner, parameters for the image correction processing are determined automatically and highly accurately corresponding to the feature quantity of the image, and the image correction processing is performed based on the parameters. Therefore, the image quality can be improved, while considerably reducing labor of an operator who performs the image processing.

Further, it is desirable that the image condition is judged by a probability belonging to each image condition, calculated by a two-dimensional normal distribution probability function in which the mean value and the standard deviation of the image feature quantity are variables. In this case, when the maximum value of the probability is larger than a predetermined value, then desirably, the image condition which becomes the maximum probability is judged to be the image condition of the image. On the other hand, when the maximum value of the probability is the predetermined value or less, then it is desirable to judge that the image belongs to a plurality of image conditions, that is, the image is in an intermediate condition. When it is judged that the image belongs to a plurality of image conditions, then desirably, image correction information is created, by integrating the image correction information in the respective image conditions corresponding to the probability.

In such a configuration, if the image condition is judged by the two-dimensional normal distribution probability function, the image condition of the image can be judged highly accurately, by appropriately setting the two-dimensional normal distribution probability function. Moreover, when the maximum value of the probability is larger than the predetermined value, if it is judged that the image condition having the maximum probability is the image condition of the image, the image condition can be judged uniquely. On the other hand, when the maximum value of the probability is the predetermined value or less, if it is judged that the image belongs to a plurality of image conditions, an image intermediate among the plurality of image conditions can be processed highly accurately. In this case, the image correction information in the respective image conditions is integrated corresponding to the probability to create the image correction information, thereby enabling to create image correction information taking the intermediate condition into consideration.

Moreover, the mean value and the standard deviation of the image feature quantity in each area obtained by dividing the image into a plurality of areas, may be multiplied by a weighting value corresponding to a difference between the maximum value and the minimum value of the image feature quantity in each area, and the sum of multiplied values is then designated as the mean value and the standard deviation of the image feature quantity. In this manner, the mean value and the standard deviation of the image feature quantity is extracted with a focus on an area considered to be a main part in the image. As a result, the judgment of the image condition can be performed with higher accuracy, as compared with a method of extracting the mean value and the standard deviation of the image feature quantity from the whole image.

Other than the above, whether or not a corrected image is an intended image may be input and an input result is stored, and the probability that the corrected image is the intended image may be displayed based on the stored input result. In this manner, when a large amount of images is pro collectively by batch processing or the like, it is only necessary to visually confirm a correction result of the image having a low probability, thereby considerably reducing the labor of the operator.

BEST MODE FOR CARRYING OUT THE INVENTION

Figure 1:
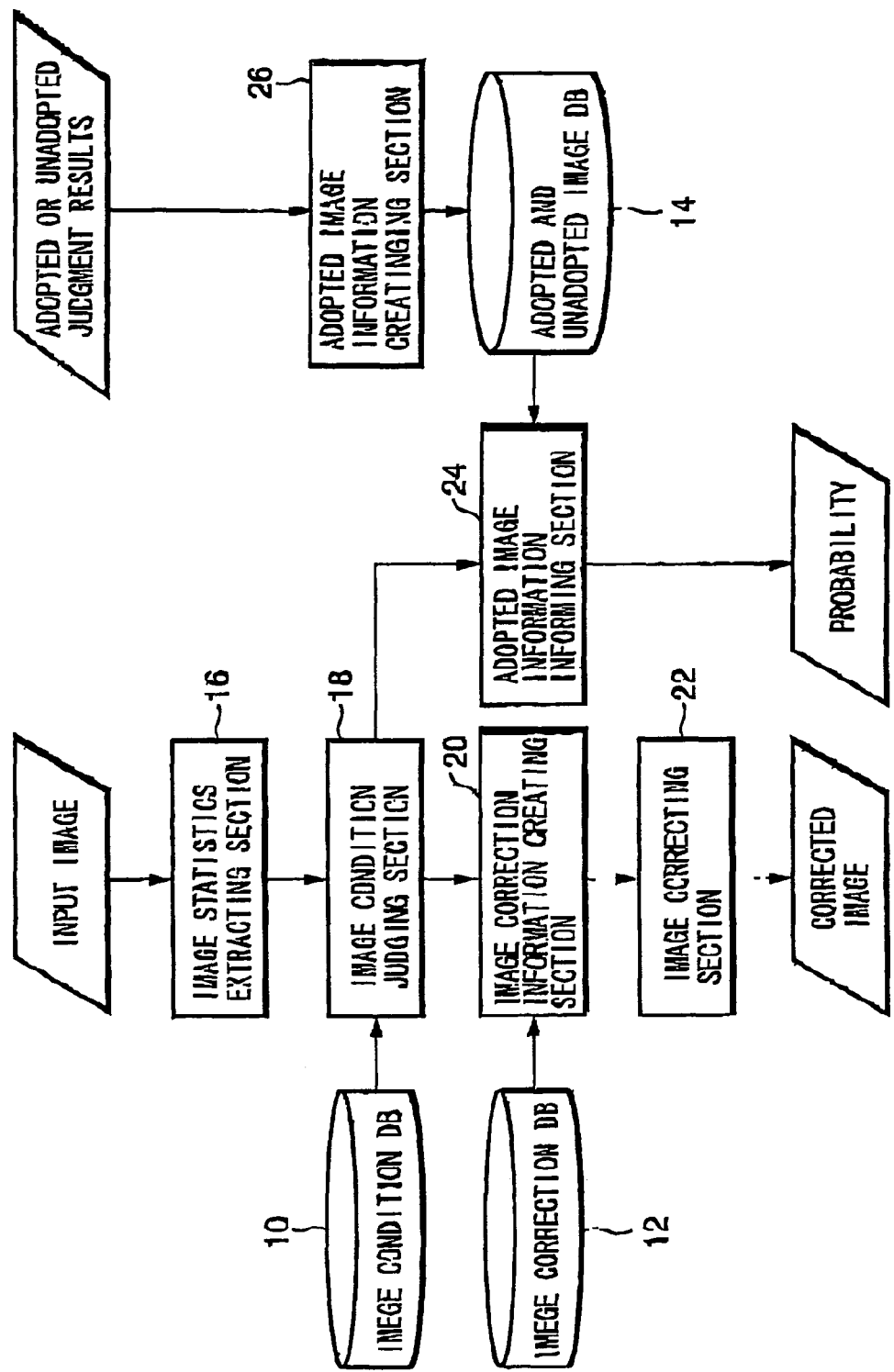
FIG. 1 is a block diagram of an image processing apparatus, which realizes the present invention.

An outline of an image processing technique according to the present invention will be described first.

In the present invention, a database is constructed in order to determine parameters for image correction processing. In other words, a plurality of images, whose image conditions are different from each other, is prepared as reference images, range transformation is conducted so that densities of the respective images are distributed over the whole density range, to perform the density normalization, and these images are set to normalized images. Next, the normalized image is displayed on a display device such as a display, and classified into respective image conditions by visual inspection of an operator. The "image condition" herein stands for an index for classifying, for example, the brightness of the image as "bright", "normal" or "dark", and the contrast as "high", "normal" or "low". When the operator has sufficient knowledge and experience relating to the image processing, the reference image itself may be displayed without performing the density normalization.

A luminance component Y for all pixels is then extracted for the normalized image classified into the respective image conditions, and a luminance mean value $\mu$ and a luminance standard deviation $\sigma$ are respectively calculated by the following equations, wherein n denotes the number of pixel in the image.

$$\mu = \sum_{i=1}^{n} \frac{Y_i}{n}$$

$$\sigma = \sqrt{\frac{1}{n}\sum_{j=1}^{n}(Y_j - \mu)^2}$$

The luminance mean value $\mu$ and the luminance standard deviation $\sigma$ of the image included in the respective image conditions are set to variables, to create a two-dimensional normal distribution probability function for each image condition, which is set as an image condition probability function $F_i(x, y)$ expressed by the following equation, wherein $\mu_x$ and $\mu_y$ respectively denote mean values of the luminance mean value $\mu$ and the luminance standard deviation $\sigma$ of the normalized image in the respective image conditions, and $\sigma_x$ and $\sigma_y$ respectively denote a standard deviation of the luminance mean value $\mu$ and the luminance standard deviation $\sigma$ of the normalized image in the respective image conditions. Moreover, $\rho_{xy}$ denotes a correlation coefficient between the luminance mean value $\mu$ and the luminance standard deviation $\sigma$ of the normalized image in the respective image conditions.

$$F_i(x, y) = \frac{1}{2\pi\sigma_x\sigma_y\sqrt{1-\rho_{xy}}}$$
$$\exp\left[-\frac{1}{2(1-\rho_{xy})}\left\{\frac{(x-\mu_x)^2}{\sigma_x^2} + \frac{(y-\mu_y)^2}{\sigma_y^2} - \frac{2\rho_{xy}(x-\mu_x)(y-\mu_y)}{\sigma_x\sigma_y}\right\}\right]$$

The image condition probability function $F_i(x, y)$ created in this manner is stored in the database for each image condition.

Moreover, an equal probability ellipse, being a group of points having equal probability value, is integrated for each image condition probability function $F_i(x, y,)$, to thereby divide it into a plurality of previously set probability sections. At this time, all the probability values of the respective probability sections are made equal. Furthermore, a unique number is added to each probability section obtained by dividing the image condition probability function from the central part towards the peripheral parts, and these are set to probability section numbers of the respective image conditions. Counters for counting the "number of adopted images" and "number of unadopted images" are respectively provided corresponding to these probability section numbers, and the contents thereof are initially set to 0.

Through such a series of processing, preparation for image processing with respect to an image whose image condition is unknown is completed. In the database for determining the parameters for the image correction processing, a default may be set using a plurality of images indicating representative image conditions.

The image processing with respect to the image whose image condition is unknown is performed in the following manner.

At first, the range transformation is conducted so that density of the image is distributed over the whole density range, to perform the density normalization, and this image is set to a normalized image P. A luminance component Y is extracted from the normalized image P for all pixels, to thereby calculate the luminance mean value $\mu$ and the luminance standard deviation $\sigma$, respectively.

Here, the luminance mean value $\mu$ and the luminance standard deviation $\sigma$ in the normalized image P may be calculated by dividing the normalized image P into a plurality of m areas and integrating the luminance mean values $\mu_m$ and the luminance standard deviations $\sigma_m$ in the respective areas. In other words, the normalized image P is divided into the plurality of m areas, and the luminance component Y is extracted for each area, to thereby respectively calculate the luminance mean value $\mu_m$ and the luminance standard deviation $\sigma_m$. A luminance difference between the highest luminance and the lowest luminance in each area is calculated, to determine a weighting value uniquely determined according to the luminance difference. At this time, the area having a large luminance difference has variations in contrast, and hence it can be judged that there exists a plurality of pixels having different brightness, hue and chroma, and more contours exist as compared with other areas. On the other hand, the area having a small luminance difference has less variation in contrast, and hence it can be judged that pixels having different brightness, hue and chroma are not so many as compared with the area having the large luminance difference. Therefore, the weighting value is set to a large value in the area having the large luminance difference and to a small value in the area having the small luminance difference.

The luminance mean value $\mu_m$ and the luminance standard deviation $\sigma_m$ are then multiplied by the weighting value for each area, and the sum of respective multiplied values is obtained, to thereby calculate luminance mean value $\mu$ and the luminance standard deviation $\sigma$ in the normalized image P. In this manner, the main object to be noted existing in the image is emphasized, and parameters for the image correction processing can be determined with higher accurately.

When the luminance mean value $\mu$ and the luminance standard deviation $\sigma$ in the normalized image P can be calculated, these are substituted in the image condition probability functions $F_i(x, y)$ in the respective image conditions, to calculate the probability values in the respective image conditions.

When the maximum probability value is larger than a predetermined value $\alpha$, it is assumed that the image condition having the maximum probability value is the image condition of the normalized image P. Then, the probability value proportion of the image condition having the maximum probability value is set to 1, and the probability value proportion of other image conditions is set to 0, in order to uniquely determine the image condition of the normalized image P. On the other hand, when the maximum probability value is the predetermined value $\alpha$ or less, it is judged that the image condition of the normalized image P cannot be determined uniquely, and hence the probability value proportion in each image condition is calculated by the following manner. That is, the sum of the probability values in the respective image conditions is calculated, and the probability value in each image condition is divided by the sum of the probability values, to thereby calculate the probability value proportion in each image condition.

When the probability value proportion in each image condition can be calculated, the image correction information is created. The image correction information includes parameters for correcting the image condition to the most appropriate image condition with respect to the luminance mean value $\mu$ and the luminance standard deviation $\sigma$ indicating the image condition. In other words, when the image condition of the normalized image P is determined uniquely, it is assumed that image correction information relating to the image condition having the probability value proportion of 1 is set to image correlation information of the normalized image P. On the other hand, when the image condition of the normalized image P is not determined uniquely, the probability value proportions are integrated corresponding to the probability value proportions in the respective image conditions and this integrated value is set to the image correction information of the normalized image P.

Image correction is then performed on the normalized image P using the image correction information. In this manner, the normalized image P is corrected to the optimum image condition. In the description below, a corrected image is referred to as a corrected image P'.

Next, a probability zone to which the probability value of the normalized image P belongs is calculated for each image condition. The sum of the number of adopted images is divided by the sum of the number of adopted images and the number of unadopted images in each image condition, for each calculated probability zone, to be informed to the operator as the "probability" of the normalized image P. However, when the sum of the number of adopted images and the number of unadopted images in each image condition is 0, the probability is not calculated, and the operator is informed that the probability is uncertain.

When the probability is informed to the operator, the corrected image P' is displayed on a screen, so that the operator judges visually whether or not the corrected image P' is the adopted image corrected to be in an intended image condition. When the corrected image P' is the adopted image, the probability value proportion is added to an adopted image counter, in the corresponding probability zones in the respective image conditions. On the other hand, when the corrected image P' is the unadopted image, the probability value proportion is added to an unadopted image counter, in the corresponding probability zones in the respective image conditions.

The processing after displaying the probability may be performed according to the instruction of the operator.

A specific example of the present invention will be described with reference to the appended drawings.

FIG. 1 shows a configuration of an image processing apparatus which realizes the image processing technique according to the present invention. The image processing apparatus is constructed on a computer equipped with at least a central processing unit (CPU) and a memory, and is operated according to a program loaded in the memory.

The image processing apparatus comprises image condition DB 10, image correction DB 12, an adopted and unadopted image DB 14, an image statistics extracting section 16, an image condition judging section 18, an image correction information creating section 20, an image correcting section 22, an adopted image information informing section 24, and an adopted image information creating section 26.

In the image condition DB 10, the image condition probability function $F_i(x, y)$ is stored for each image condition. The image condition probability function $F_i(x, y)$ is created through the process described above.

In the image correction DB 12, a gamma value y, corresponding to the luminance mean value $\mu$ and the luminance standard deviation $\sigma$ is stored for each image condition, as a parameter for the image correction processing.

In the adopted and unadopted image DB 14, an adopted image counter $AC_{in}$ and an unadopted image counter $RC_{in}$ are stored as indexes indicating whether or not a gamma-corrected image is to be accepted. The adopted image counter $AC_{in}$ and the unadopted image counter $RC_{in}$ are constructed so that a real value can be calculated, taking into consideration that the image may belong to a plurality of image conditions.

The image statistics extracting section 16 extracts the luminance mean value $\mu$ and the luminance standard deviation $\sigma$ as an image feature quantity of an image to be image processed (hereunder referred to as "input image"). In other words, after the density of the input image is normalized by the range transformation, the luminance mean values $\mu$ and the luminance standard deviations $\sigma$ with respect to the luminance component of all pixels are respectively calculated. The image statistics extracting section 16 realizes a statistics extracting function, a statistics extracting step and statistics extracting means.

The image condition judging section 18 calculates the probability value proportion $G_i$ in each image condition of the input image, based on the luminance mean value $\mu$ and the luminance standard deviation $\sigma$ in the normalized image P. The "probability value proportion" herein stands for the proportion at which the input image belongs to each image condition, and for example, when the brightness is slightly dark, the probability value proportions in a bright condition, a normal condition and a dark condition become 0.0, 0.5 and 0.5, respectively. The image condition judging section 18 realizes an image condition judging function, an image condition judging step and image condition judging means.

The image correction information creating section 20 creates image correction information for correcting the image condition of the input image to an optimum. In other words, image correction information in the respective image conditions is read from the image correction DB 12, based on the luminance mean value μ and the luminance standard deviation σ in the normalized image P, to create the image correction information with respect to the whole image corresponding to the probability value proportion $G_i$. The image correction information creating section 20 realizes a correction information creating function, a correction information creating step and correction information creating means.

The image correcting section 22 corrects the input image based on the image correction information created by the image correction information creating section 20. The image correcting section 22 realizes an image correcting function, an image correcting step and image correcting means.

The adopted image information informing section 24 informs the operator of the "probability". Here, the "probability" is an index indicating the likelihood that the corrected image P' is corrected to the image condition intended by the operator. The adopted image information informing section 24 realizes a probability display function.

In the adopted image information creating section 26, whether or not correction intended by the operator has been performed with respect to the input image is input, to update the adopted image counter $AC_{in}$ or the unadopted image counter $RC_{in}$ stored in the adopted and unadopted image DB 14. The adopted image information creating section 26 realizes an input function and an input result storing function.

Figure 2:
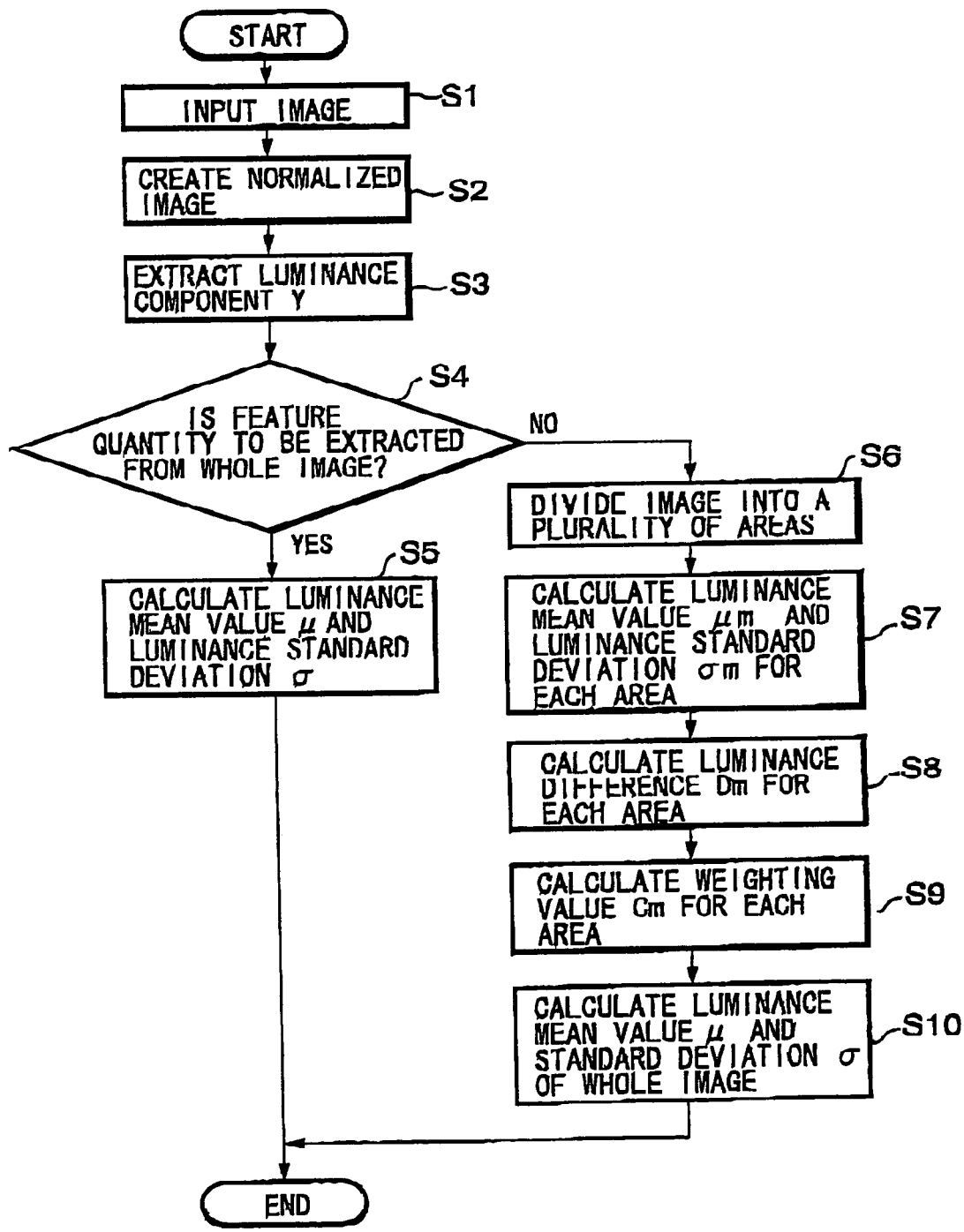
FIG. 2 is a flowchart showing the processing content in an image statistics extracting section.

FIG. 2 shows extraction processing of the image feature quantity executed in the image statistics extracting section 16.

In step 1 (in the figure, abbreviated as "S1", and similarly thereafter), the input image is input. The input image is a color image in which RGB form the color space, and for example, an image obtained by scanning a silver-salt photograph by a scanner, or an image photographed by a digital camera is used.

In step 2, the normalized image P obtained by normalizing the density of the input image is created. In other words, the range transformation of the input image is conducted so that the density of the pixels in the input image is distributed over the whole range where the density can be distributed (for example, from 0 to 255 in an image having eight bits for each color), to thereby create the normalized image P.

In step 3, the luminance component Y is extracted by, for example, the following equation, for the whole pixels in the normalized image P. Here, R, G and B respectively indicate values of the RGB components in the pixel.

Luminance $Y=0.30 \times R+0.59 \times G+0.11 \times B$

In step 4, it is judged whether or not image feature quantity is to be extracted from the whole image. The construction is desirable such that, whether or not the image feature quantity is to be extracted from the whole image, can be optionally set on the screen where the operation of the image processing apparatus is performed. If the image feature quantity is to be extracted from the whole image, control proceeds to step 5 (Yes), while if the image feature quantity is not to be extracted from the whole image, control proceeds to step 6 (No).

In step 5, the luminance mean value μ and the luminance standard deviation σ are calculated for all pixels in the normalized image P by the following equations. Here, n denotes the number of pixels in the normalized image P.

$$\mu = \sum_{l=1}^{n} \frac{Y_l}{n}$$

$$\sigma = \sqrt{\frac{1}{n} \sum_{j=1}^{n} (Y_j - \mu)^2}$$

In step 6, the normalized image P is divided into a plurality of areas. For example, as shown in (A) and (B) of FIG. 3, the normalized image P is evenly divided into three longitudinally and laterally, respectively, to obtain nine areas $A_m$ ($1 \leq m \leq g$) having a substantially uniform area.

In step 7, the luminance mean value $\mu_m$ and the luminance standard deviation $\sigma_m$ are calculated for each area $A_m$ by the following equations, wherein $n_m$ denotes the number of pixels in the area $A_m$.

$$\mu_m = \sum_{l=1}^{n_m} \frac{Y_l}{n_m}$$

$$\sigma_m = \sqrt{\frac{1}{n_m} \sum_{j=1}^{n_m} (Y_j - \mu_m)^2}$$

in step 8, the maximum luminance $Y_{max}$ and the minimum luminance $Y_{min}$ of the pixel are determined for each area $A_m$, and a luminance difference $D_m$ between them is calculated by the following equation.

Luminance difference $D_m = Y_{max} - Y_{min}$

Figure 3:
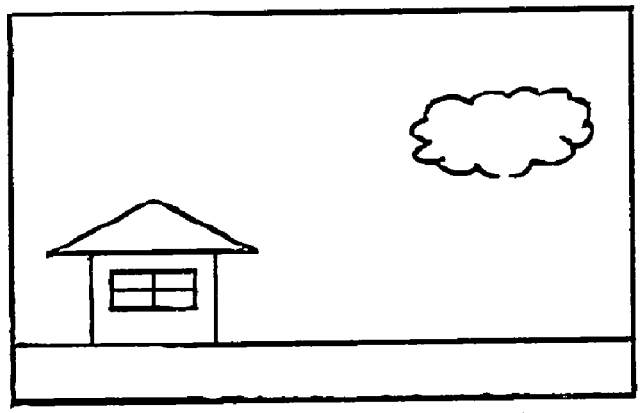
FIG. 3 shows a procedure for dividing an input image to calculate image statistics, in which (A) shows an input image, (B) shows the divided input image and (C) shows weighting values for respective areas.
Figure 3:
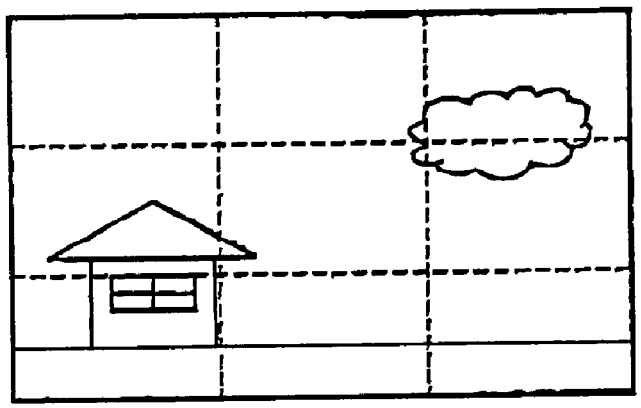

In step 9, as shown in (C) of FIG. 3, a weighting value $C_m$ uniquely determined corresponding to the luminance difference $D_m$ is calculated. Here, the weighting value $C_m$ is set such that the weighting value in an area having the largest luminance difference is 1.0, and the weighting value in other area is a value smaller than 1.0 (for example, 0.0).

In step 10, the luminance mean value μ and the luminance standard deviation σ of the whole image are calculated by the following equations, taking into consideration the feature of each area $A_m$.

$$\mu = \sum_{m=1}^{g} (\mu_m \times C_m)$$

$$\sigma = \sum_{m=1}^{g} (\sigma_m \times C_m)$$

According to the processing of from step 1 to step 10 described above, the normalized image P obtained by normalizing the density at the input image is created, and the luminance Y is extracted from all pixels. When the image feature quantity is to be extracted from the whole image, the luminance mean value μ and the luminance standard deviation σ are calculated for all pixels in the normalized image P. On the other hand, when the image feature quantity is not extracted from the whole image, the normalized image P is divided into the plurality of areas $A_m$, and the luminance mean value $\mu_m$ and the luminance standard deviation $\sigma_m$ are calculated for each area $A_m$. Then, the luminance mean value $\mu$ and the luminance standard deviation σ of the whole image are calculated, using the weighting value $C_m$ corresponding to the luminance difference $D_m$ in each area $A_m$.

Therefore, when the normalized image P is divided into the plurality of areas $A_m$, in an area having a large luminance difference, there are variations in contrast, and hence it is expected that there exists a plurality of pixels having different brightness, hue and chroma, and more contours exist as compared with other areas. Therefore, the image statistics value is extracted, with a focus on an area containing a main part to be noted, and hence the feature of the image can be extracted highly accurately.

Figure 4:
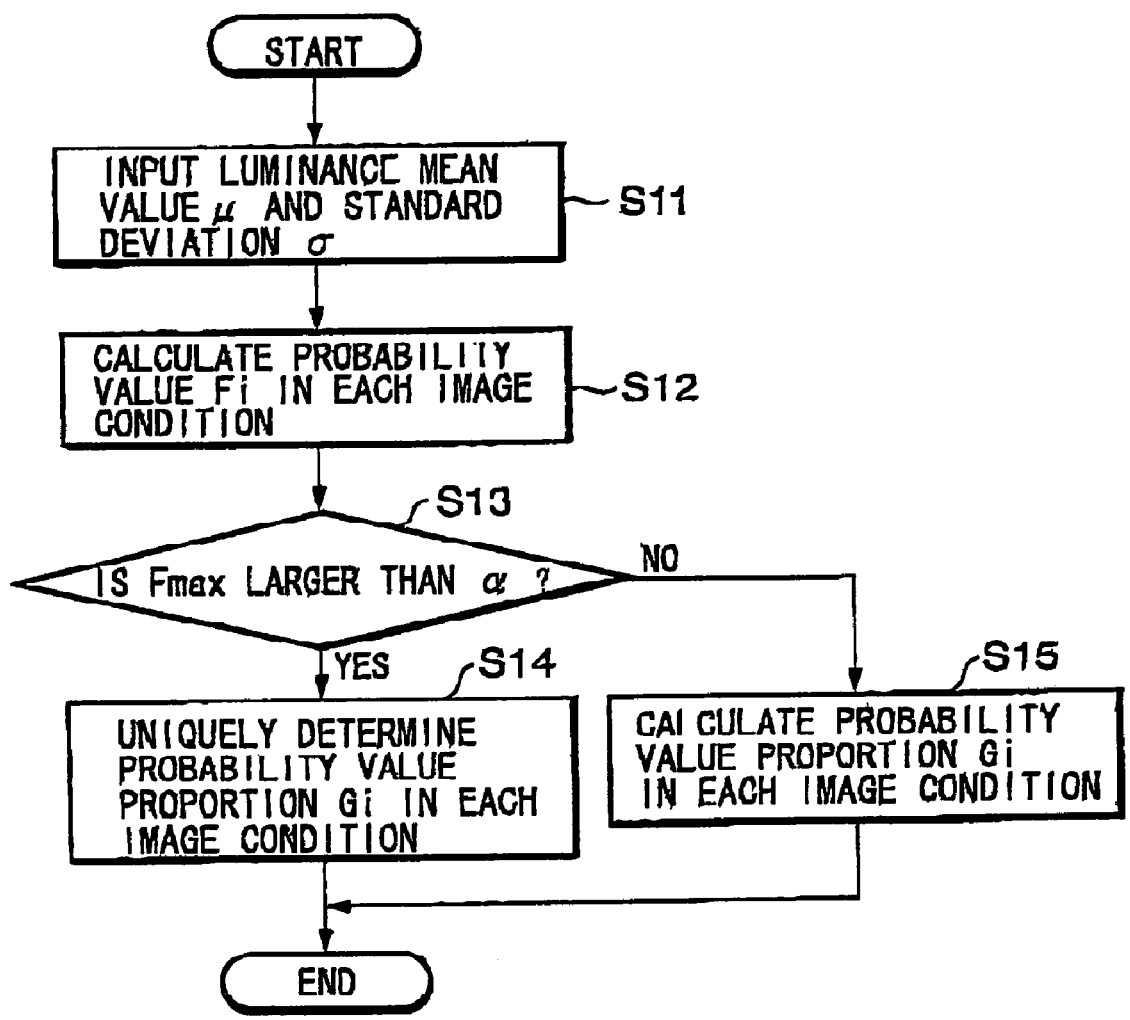
FIG. 4 is a flowchart showing the processing content in an image condition recognizing section.

FIG. 4 shows the probability value proportion calculation processing executed in the image condition judging section 16.

In step 11, the luminance mean value μ and the luminance standard deviation σ are input.

In step 12, the luminance mean value μ and the luminance standard deviation σ are substituted in the image condition probability function $F_i(x, y)$ ($1 \leq i \leq 3$) stored in the image condition DB 10, to calculate the probability value $F_i(\mu, \sigma)$ in each image condition.

In step 13, it is judged whether or not the maximum value $F_{max}$ of the probability value is larger than the predetermined value α. If the maximum value $F_{max}$ is larger than the predetermined value α, control proceeds to step 14 (Yes), while if the maximum value $F_{max}$ is the predetermined value α or less, control proceeds to step 15 (No).

In step 14, the probability value proportion $G_i$ in the image condition in which the probability value becomes the maximum is set to 1.0, and the probability value proportion $G_i$ in other conditions is set to 0.0.

In step 15, the total of the probability values of all image conditions is calculated according to the following equation, and the probability value in each image condition is divided by the total of the probability values, and the result is set to the probability value proportion $G_i$ ($1 \leq i \leq 3$).

$$G_i = \frac{F_i(\mu, \sigma)}{\sum_{j=1}^{3} F_j(\mu, \sigma)}, \text{ where } 1 \leq i \leq 3$$

According to the processing of from step 11 to step 15 described above, the probability value proportion $G_i$ in each image condition is calculated, based on the luminance mean value μ and the luminance standard deviation σ in the normalized image P. Therefore, the proportion at which the input image belongs to the respective image conditions can be understood through the probability value proportion $G_i$.

Figure 5:
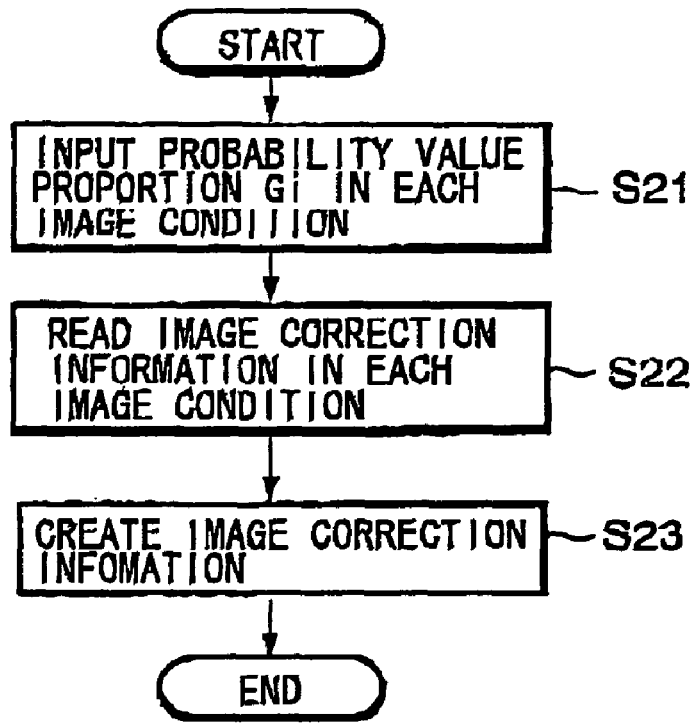
FIG. 5 is a flowchart showing the processing content in an image correction information creating section.

FIG. 5 shows the image correction information creation processing, executed in the image correction information creating section 20.

In step 21, the probability value proportion $G_i$ in each image condition is input.

In step 22, the image correction information corresponding to the luminance mean value μ and the luminance standard deviation σ in the normalized image P, specifically, the gamma value $\gamma_i$ ($1 \leq i \leq 3$) is read from the image correction DB 12.

In step 23, a gamma value $\gamma_p$ for correcting the input image is obtained. That is to say, as shown in the following equation, the probability value proportions $G_i$ in the respective image conditions of the normalized image P and the gamma value $\gamma_i$ are multiplied, and the sum thereof is set to the gamma value $\gamma_p$ for correcting the image correction.

$$\gamma_p = \sum_{i=1}^{3} (G_i \times \gamma_i)$$

According to the processing of from step 21 to step 23 described above, the gamma values $\gamma_i$ in the respective image condition corresponding to the luminance mean value μ and the luminance standard deviation σ in the normalized image P are read. Then, the read gamma values $\gamma_i$ is distributed and integrated, corresponding to the probability value proportions $G_i$ in the respective image conditions of the normalized image $P_i$ to thereby obtain the gamma value $\gamma_p$ for correcting the input image.

Figure 6:
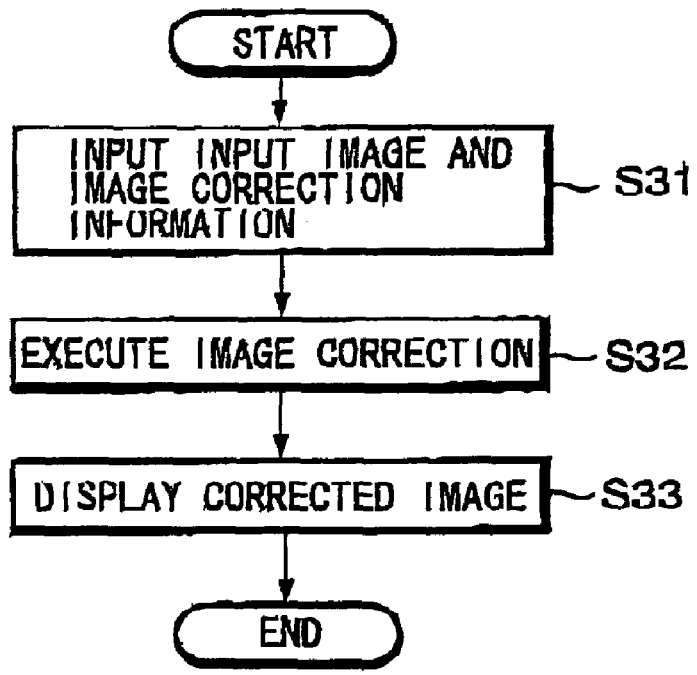
FIG. 6 is a flowchart showing the processing content in an image correcting section.

FIG. 6 shows image correction processing for the input image, executed in the image correcting section 22.

In step 31, the input image and the image correction information are input.

In step 32, gamma correction is executed on the input image, according to the following equation, using the gamma value $\gamma_{pi}$, being the image correction information. In the gamma correction, a pixel value x of the input image is converted to an output pixel value y by a gamma curve. Here, the gamma correction is executed on the respective components of RGB in the input image, and an output image thereof is set to the corrected image P'.

$$y = x^{\gamma_p}$$

In step 33, the corrected image P' is displayed via the display device.

According to the processing of from step 31 to step 33 described above, the gamma correction is executed on the input image, using the gamma value $\gamma_p$ as the image correction information. Then, the corrected image P' is displayed via the display device.

Figure 7:
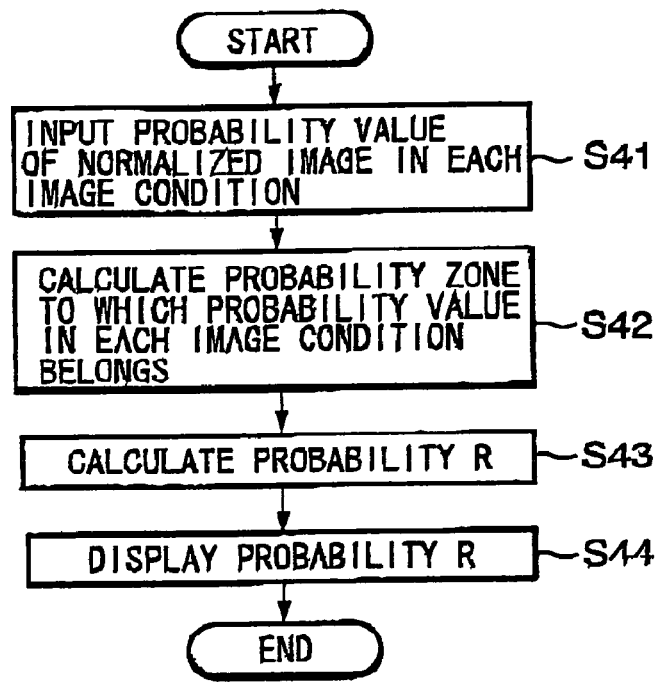
FIG. 7 is a flowchart showing the processing content in an adopted image information informing section.

FIG. 7 shows "probability" informing processing executed in the adopted image information informing section 24.

In step 41, the probability value $F_i$ ($\mu, \sigma$)($1 \leq i \leq 3$) of the normalized image P in each image condition is input.

In step 42, the probability zone n to which the probability value $F_i(\mu, \sigma)$ of the normalized image P in each image condition belongs is calculated.

In step 43, the adopted image counter $AC_{in}$ and the unadopted image counter $RC_{in}$ in each image condition are taken out from the adopted and unadopted image DB 14, for the calculated probability zone n, and "probability" R of the input image is calculated according to the following equation. However, in the following equation, if the denominator is 0, the "probability" R is not calculated, and the operator is informed that the "probability" is uncertain.

$$R = \frac{\sum_{i=1}^{3} AC_{in}}{\sum_{i=1}^{3} AC_{in} + \sum_{i=1}^{0} RC_{in}}$$

In step 44, the "probability" R is displayed via the display device.

According to the processing of from step 41 to step 44 described above, the "probability" R is informed to the operator of the image processing apparatus, as an index indicating the "probability" that the intended correction has been performed. Therefore, for example, even when a large amount of images is collectively processed by batch processing, it is only necessary to visually confirm the correction result of the images having the "probability" R of the predetermined value or less, thereby further reducing the labor of the operator.

Figure 8:
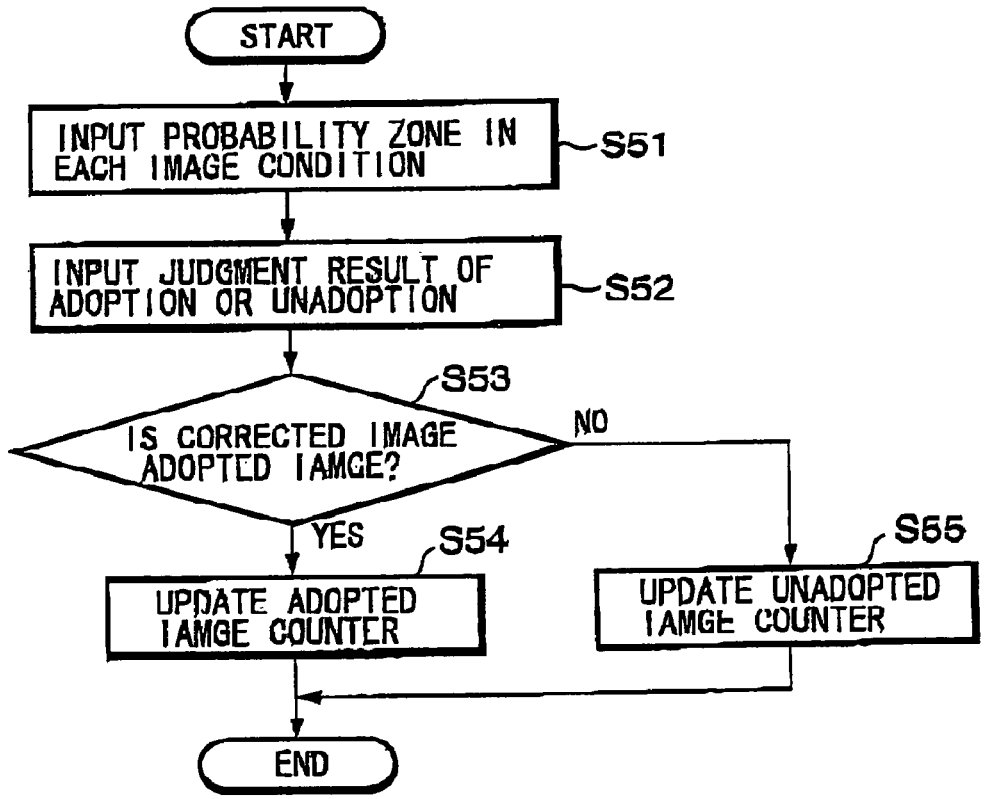
FIG. 8 is a flowchart showing the processing content in an adopted image information creating section.

FIG. 8 shows update processing of the adopted image counter and the unadopted image counter, executed in the adopted image information creating section 26.

In step 51, the probability zone n in each image condition is input.

In step 52, the judgment result by the visual inspection of the operator, of whether the corrected image P' is the "adopted image" closed to the intended image condition, or the "unadopted image" far from the intended image condition, is input.

In step 53, it is judged whether or not the corrected image P' is the adopted image. If the corrected image P' is the adopted image, control proceeds to step 54 (Yes), while if the corrected image P' is the unadopted image, control proceeds to step 55 (No).

In step 54, the adopted image counter $AC_{in}$ in the probability zone n stored in the adopted and unadopted image DB is updated for each image condition according to the following equation.

$$AC_{in} = AC_{in} + G_i$$

In step 55, the unadopted image counter $RC_{in}$ in the probability zone n stored in the adopted and unadopted image DB is updated for each image condition according to the following equation.

$$RC_{in} = RC_{in} + G_i$$

According to the processing of from step 51 to step 55 described above, the adopted image counter or the unadopted image counter is updated according to the judgment result of the "adopted image" or the "unadopted image" indicating whether or not the corrected image P' is to be accepted. Therefore, as the number of uses of the image processing apparatus is increased, the data for calculating the "probability" R of the corrected image P' is enriched, thereby enabling improvement in the calculation accuracy.

According to the image processing apparatus having such a configuration, the probability value proportion $G_i$ in each image condition to which the input image belongs is calculated by the image condition probability function $F_i$ prepared in advance, based on the luminance mean value $\mu$ and the luminance standard deviation $\sigma$ indicating the feature quantity of the input image. Then, the gamma values $\gamma_i$ as the image correction information in the respective image conditions are calculated, and the gamma value $\gamma_p$ is calculated by distributing and integrating the gamma values $\gamma_i$ corresponding to the calculated probability value proportion $G_i$. Thereafter, the input image is gamma-corrected by the gamma value $\gamma_p$. Hence, the parameters for the image correction are automatically set, by appropriately setting the image condition probability function $F_i$ in each image condition, and the input image is corrected without the intervention of the operator. As a result, since the parameters for the image correction processing are automatically and highly accurately determined corresponding to the image feature quantity, the image quality can be improved, while considerably reducing the labor of the operator.

When the corrected image is displayed, the labor of the operator can be further reduced, by also displaying the "probability" as an index indicating the likelihood that it is an image intended by the operator. In other words, the operator needs only to selectively monitor or inspect the images having low "probability", without the need of monitoring or inspecting all corrected images. Here, since the "probability" is calculated based on the adopted image counter and the unadopted image counter in which the judgment results by the visual inspection of the operator are accumulated, then with an increase in the number of use of the image processing apparatus, the data for the calculation is enriched, thereby enabling improvement in the calculation accuracy.

If a program for realizing such functions is recorded on a computer-readable recording medium, such as a magnetic tap, a magnetic disk, a magnetic drum, an IC card, a CD-ROM, a DVD-ROM or the like, the image processing program according to the present invention can be distributed in the market. Then, a person who acquires such a recording medium can easily construct the image processing apparatus according to the present invention using a general computer.

INDUSTRIAL APPLICABILITY

As described above, the image processing technique according to the present invention can improve image quality, while considerably reducing the labor of the operator, by determining the parameters for the image correction processing corresponding to the image feature quantity automatically and highly accurately. Hence, it is extremely useful.

What is claimed is:

1. An image processing program on a computer readable medium for realizing on a computer:

a normalizing function normalizing a feature quantity of an image through conducting a range transformation which allows the feature quantity of the image to be distributed over a whole range;

a statistics extracting function extracting a mean value and a standard deviation of the normalized feature quantity of the image;

an image condition judging function judging an image condition, based on the extracted mean value and the extracted standard deviation;

a correction information creating function creating image correction information in the judged image condition based on the extracted mean value and the extracted standard deviation; and an image correcting function correcting the image, based on the created image correction information, wherein said image condition judging function judges the image condition of said image through a two-dimensional normal distribution probability function for calculating the probability that an image belongs to each image condition, in which the mean value and the standard deviation of the image feature quantity are set to variables, wherein when the maximum value of said probability is a predetermined value or less, said image condition judging function judges that said image belongs to a plurality of image conditions, and wherein when it is judged by said image condition judging function that said image belongs to the plurality of image conditions, said correction information creating function integrates the image correction information in the respective image conditions, corresponding to said probability, to create the image correction information.

2. An image processing program according to claim 1, wherein when the maximum value of said probability is larger than a predetermined value, said image condition judging function judges that the image condition which becomes said probability is the image condition of said image.

3. An image processing program on a computer readable medium for realizing on a computer:
a normalizing function normalizing a feature quantity of an image through conducting a range transformation which allows the feature quantity of the image to be distributed over a whole range;
a statistics extracting function extracting a mean value and a standard deviation of the normalized feature quantity of the image;
an image condition judging function judging an image condition, based on the extracted mean value and the extracted standard deviation;
a correction information creating function creating image correction information in the judged image condition based on the extracted mean value and the extracted standard deviation; and
an image correcting function correcting the image, based on the created image correction information,
wherein said statistics extracting function multiplies the mean value and the standard deviation of the image feature quantity in each area obtained by dividing the image into a plurality of areas, by a weighting value corresponding to a difference between the maximum value and the minimum value of the image feature quantity in each area, and sets the sum of said multiplied values as the mean value and the standard deviation of the image feature quantity.

4. An image processing program on a computer readable medium for realizing on a computer:
a normalizing function normalizing a feature quantity of an image through conducting a range transformation which allows the feature quantity of the image to be distributed over a whole range;
a statistics extracting function extracting a mean value and a standard deviation of the normalized feature quantity of the image;
an image condition judging function judging an image condition, based on the extracted mean value and the extracted standard deviation;
a correction information creating function creating image correction information in the judged image condition based on the extracted mean value and the extracted standard deviation;
an image correcting function correcting the image, based on the created image correction information;
an input function inputting whether or not the corrected image is an intended image;
an input result storing function storing a result input through said input function; and
a probability display function displaying the probability that said corrected image is the intended image, based on the input result stored by said input result storing function.

5. A computer-readable recording medium recorded with an image processing program for realizing on a computer:
normalizing a feature quantity of an image through conducting a range transformation which allows the feature quantity of the image to be distributed over a whole range;
extracting a mean value and a standard deviation of the normalized feature quantity of the image;
judging an image condition, based on the extracted mean value and the extracted standard deviation;
creating image correction information in the judged image condition based on the extracted mean value and the extracted standard deviation; and
correcting the image, based on the created image correction information
wherein said judging judges the image condition of said image through a two-dimensional normal distribution probability function for calculating the probability that an image belongs to each image condition, in which the mean value and the standard deviation of the image feature quantity are set to variables;
wherein when the maximum value of said probability is a predetermined value or less, said judging judges that said image belongs to a plurality of image conditions, and
wherein when it is judged by said judging that said image belongs to the plurality of image conditions, said creating integrates the image correction information in the respective image conditions, corresponding to said probability, to create the image correction information.

6. A computer-readable recording medium recorded with an image processing program according to claim 5,
wherein when the maximum value of said probability is larger than a predetermined value, said judging judges that the image condition which becomes said probability is the image condition of said image.

7. A computer-readable recording medium recorded with an image processing program for realizing on a computer:
normalizing a feature quantity of an image through conducting a range transformation which allows the feature quantity of the image to be distributed over a whole range;
extracting a mean value and a standard deviation of the normalized feature quantity of the image;
judging an image condition, based on the extracted mean value and the extracted standard deviation;
creating image correction information in the judged image condition based on the extracted mean value and the extracted standard deviation; and
correcting the image, based on the created image correction information,
wherein said extracting multiplies the mean value and the standard deviation of the image feature quantity in each area obtained by dividing the image into a plurality of areas, by a weighting value corresponding to a difference between the maximum value and the minimum value of the image feature quantity in each area, and sets the sum of said multiplied values as the mean value and the standard deviation of the image feature quantity.

8. A computer-readable recording medium recorded with an image processing program for realizing on a computer:
normalizing a feature quantity of an image through conducting a range transformation which allows the feature quantity of the image to be distributed over a whole range;

extracting a mean value and a standard deviation of the normalized feature quantity of the image;

judging an image condition, based on the extracted mean value and the extracted standard deviation, creating image correction information in the judged image condition based on the extracted mean value and the extracted standard deviation;

correcting the image, based on the created image correction information;

inputting whether or not the corrected image is an intended image;

storing a result input through said inputting; and displaying the probability that said corrected image is the intended image, based on the input result stored by said storing.

\* \* \* \* \*

UNITED STATES PATENT AND TRADEMARK OFFICE
CERTIFICATE OF CORRECTION

PATENT NO. : 7,079,702 B2 Page 1 of 1
APPLICATION NO. : 10/629718
DATED : July 18, 2006
INVENTOR(S) : Masahiro Watanabe et al.

It is certified that error appears in the above-identified patent and that said Letters Patent is hereby corrected as shown below:

Column 14, Line 14, after "information" insert --,--.

Signed and Sealed this

Twenty-sixth Day of December, 2006

JON W. DUDAS
*Director of the United States Patent and Trademark Office*